United States Patent [19]

Kobayashi

[11] 4,355,520

[45] Oct. 26, 1982

[54] PROCESS FOR THE SEPARATION OF SOLUTE IN CRYOHYDRATE AND APPARATUS THEREFOR

[75] Inventor: Toshio Kobayashi, Tokyo, Japan

[73] Assignee: Director of National Food Research Institute, Ministry of Agriculture, Forestry and Fisheries, Ibaraki, Japan

[21] Appl. No.: 239,138

[22] Filed: Feb. 27, 1981

[30] Foreign Application Priority Data

Mar. 29, 1980 [JP] Japan .................................. 55-40853

[51] Int. Cl.³ .............................................. B01D 9/04
[52] U.S. Cl. ........................................ 62/123; 62/543; 62/532
[58] Field of Search .................. 62/543, 532, 123, 124

[56] References Cited

U.S. PATENT DOCUMENTS

| | | | |
|---|---|---|---|
| 2,424,663 | 7/1947 | Mantle | 62/543 |
| 2,921,444 | 1/1960 | Bump et al. | 62/543 |
| 3,113,161 | 12/1963 | Schmalenbach | 62/543 |
| 3,232,218 | 2/1966 | Soussloff et al. | 62/543 |

Primary Examiner—Norman Yudkoff
Attorney, Agent, or Firm—Frishauf, Holtz, Goodman & Woodward

[57] ABSTRACT

A process for the separation of one or more kinds of solute in a cryohydrate characterized in that a cryohydrate obtained by freezing a solution together with a high tensile member is passed through pressure-application zones whose inner sectional area is reduced toward the direction in which the high tensile member is pulled to thereby separate fractions having high solute contents from fractions having low solute contents, and apparatus therefor.

5 Claims, 8 Drawing Figures

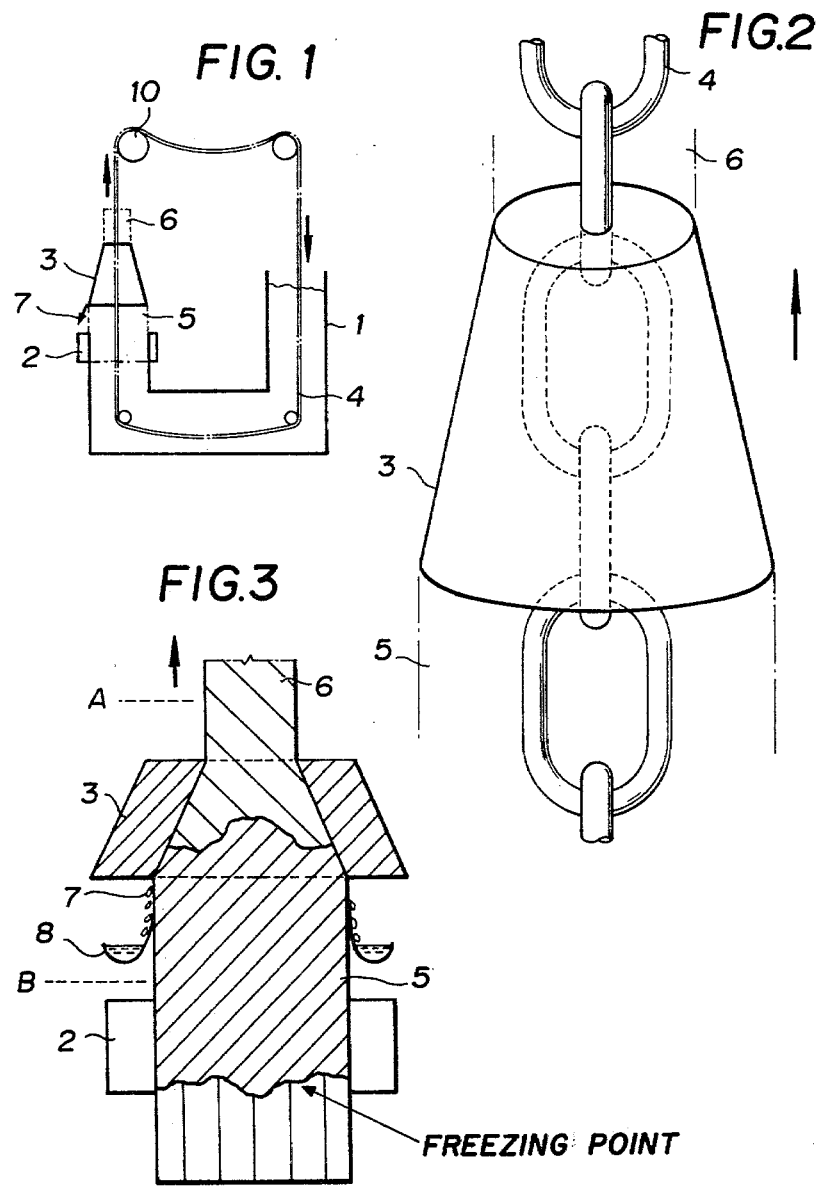

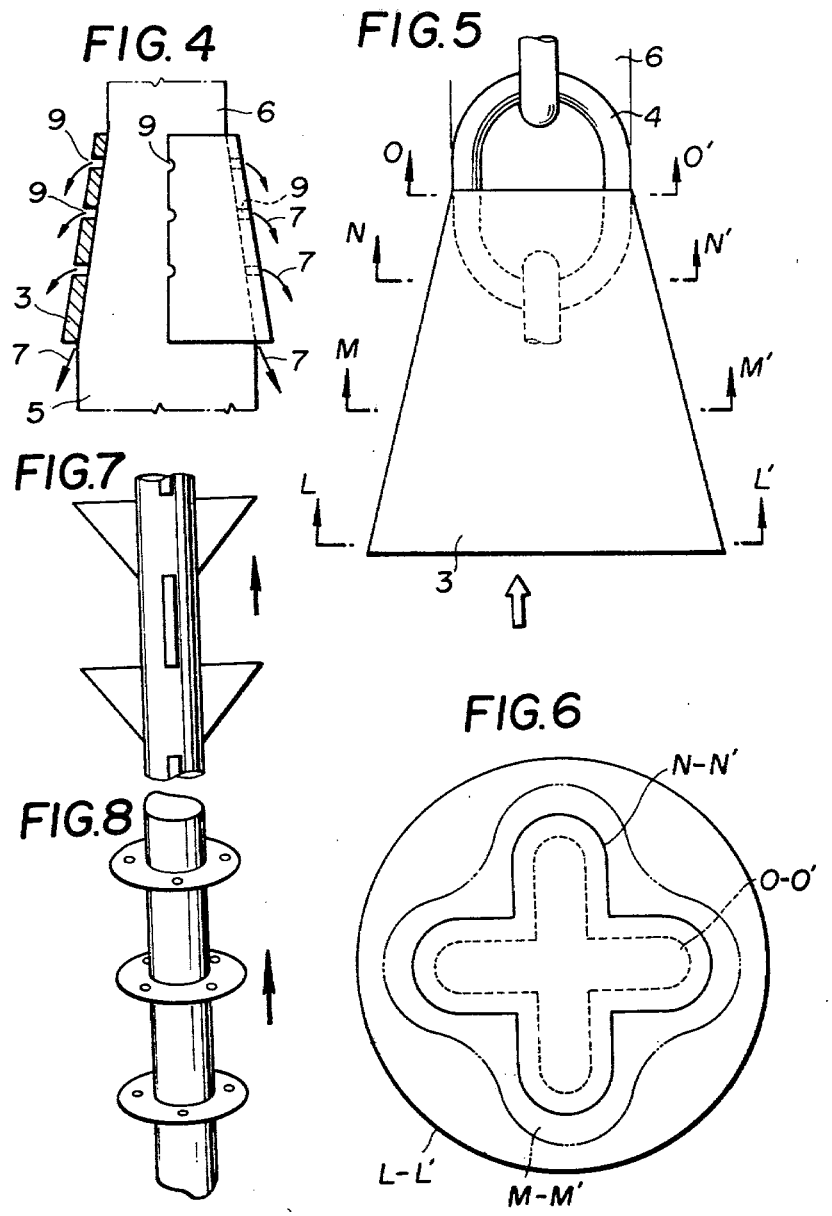

PROCESS FOR THE SEPARATION OF SOLUTE IN CRYOHYDRATE AND APPARATUS THEREFOR

BACKGROUND OF THE INVENTION

This invention relates to a process for the separation of solute in a cryohydrate, and an apparatus therefor. More particularly, it relates to a so-called freeze-concentration process in which solutes contained in a solution are separated into solute-rich fractions, i.e. fractions having high solute contents and solute-poor fractions, i.e., fraction having low solute contents in the state that a medium is frozen, and an apparatus for use therein.

The freeze-concentration process has not yet been commercially in widespread use although it has many advantages in view of its principle, for example, in that a heat-sensitive substance can be treated and the energy required for separation can be saved. The major reason for this is that a solid fraction (hereinafter, referred to as "cryohydrate") solidified after cooling a solution contains a large amount of solute or solutes and, thus, the solute cannot be sufficiently removed even after application of procedures such as solid-liquid separation and washing.

SUMMARY OF THE INVENTION

A principal object of this invention is to separate solute-rich fractions contained in a cryohydrate from solute-poor fractions by application of very high pressure and to provide two or more solute-containing fractions (both liquid and solid) having different solute contents.

This invention, therefore, provides a process for the separation of solute or solutes in a cryohydrate which comprises passing a cryohydrate obtained by freezing a solution together with a high tensile member through a pressure-application zone whose inner sectional area is reduced toward the direction in which the high tensile member is pulled to thereby separate fractions having high solute contents from fractions having low solute contents.

Furthermore, this invention provides an apparatus for the separation of solute or solutes in a cryohydrate which comprises:

an endless high tensile member;
a reservoir to store therein a solution;
a freezing unit connected to the reservoir;
a pressure-application unit, the inner sectional area of which is reduced toward the direction in which the endless high tensile member is pulled, and which is provided with a liquid receiver at a lower portion thereof; and
a driving unit to drive the endless high tensile member so that it can move through the reservoir, the freezing unit and the pressure-application unit.

Hereinafter, the location of the freezing unit where the solution is actually frozen, and the location of the pressure-application where pressure is actually applied on the cryohydrate are called, respectively, the freezing zone and the pressure-application zone.

BRIEF DESCRIPTION OF THE DRAWINGS

FIG. 1 is a schematic diagram of a process for the separation of solute or solutes in a cryohydrate according to this invention;

FIGS. 2 and 3 each show the principle of this invention, wherein in FIG. 3 a high tensile member is omitted for the sake of convenience;

FIG. 4 shows another embodiment of this invention;

FIGS. 5 and 6 are each an illustrative view of a pressure-application zone according to this invention;

FIG. 7 shows a metallic rod with a projection provided thereon, which is used as a high tensile member of this invention; and FIG. 8 shows a metallic rod with a ring-like projection provided thereon, which is used as a high tensile member of this invention.

DETAILED DESCRIPTION OF THE INVENTION

The depression of the freezing point of a medium, such as water and an organic solvent, containing one or more kinds of solute is produced by applying pressure thereon and changing the concentration of the solute. Therefore, by applying pressure on a cryohydrate of a solution, solute-rich fractions melt selectively and move through fine voids of the cryohydrate to the zone where the pressure applied is low, associate with each other, grow into big liquid droplets, and increase its flowability. Thus, the solute-rich fractions can be removed from the cryohydrate at an end point where no pressure is applied.

The process of this invention is characterized in that a markedly high pressure can be applied on the cryohydrate by a very convenient means and the separation of the solute can be carried out continuously.

Hereinafter, this invention will be explained in detail with reference to the accompanying drawings.

FIG. 1 is a schematic diagram of a process for the separation of solute or solutes according to this invention. A feed solution in a reservoir 1 is frozen together with a high tensile member 4 at a freezing zone 2. This freezing can be performed by any known method; for example, a method of circulating a suitable refrigerant can be employed.

The solution is sent to the freezing zone 2 together with the endless high tensile member 4, wherein it is frozen in a manner so that the high tensile member 4 is enveloped therein. Thus, a cryohydrate 5 is obtained.

The high tensile member 4 is then slowly pulled in the direction indicated by the arrow and passed through a pressure-application zone 3. The direction in which the high tensile member is pulled is not critical, and it can be pulled in any of upward, downward, horizontal and angled directions.

The pressure-application zone 3 and the freezing zone 2 may be provided either compositely or independently as shown in FIG. 1. It is essential, however, that the pressure-application zone 3 has a reduced sectional area in the direction in which the high tensile member 4 is pulled, for example, it has a cone-shaped inner surface.

When the cryohydrate 5 passes through the pressure-application zone 3, it is pressed against the inner surface of the pressure-application zone 3 because its inner sectional area is decreased in the direction in which the tensile member 4 is pulled, and thus pressure is applied onto the cryohydrate 5 according to the force with which the tensile member 4 is pulled.

The rate at which the high tensile member is pulled is not critical. For example, in the case of a cryohydrate of an aqueous sugar solution, it is pulled at a rate of from about several centimeters to several ten centimeters per minute. When the rate is small, the high tensile member can be simply pulled with a small-sized motor, etc., utilizing the principle of wheels and axle.

The high tensile member 4 is required to be durable to a high tension up to about several ten tons. As such high tensile members, a chain member as shown in FIG. 2 and a steel rope are preferred. In addition, the metallic rods with projections provided thereon as illustrated in FIGS. 7 and 8 can be used. By using such high tensile members, a pressure of more than several ten kilograms per unit area (cm$^2$) can be applied on the cryohydrate by a simplified method.

When the high tensile member is a member to prevent the cryohydrate from sliding therefrom, such as a chain member, no sliding between the surface of the high tensile member and the cryohydrate occurs and a cryohydrate 6 having a low solute content, which is nearly equal to the pure medium, is obtained from a downstream side A of the pressure-application zone 3 in FIG. 3. On the other hand, from the up-stream side B of the pressure-application zone 3, a liquid 7 having a high solute content, i.e., solute-rich liquid is obtained.

The liquid 7 is withdrawn into a receiver 8 and then taken out of the system.

As illustrated in FIG. 3, the cryohydrate 6 leaving the pressure-application zone 3 has a smaller sectional area than before it enters to the pressure-application zone 3.

Although FIGS. 2 and 3 each show a pressure-application zone 3 comprising one stage in order to explain the principle of this invention, the pressure-application zone 3 may comprise a plurality of stages. In this case, the liquid 7 can be withdrawn at each stage and thus the separation of the objective solute or solutes can be performed more completely.

The liquid 7 can be withdrawn not only from the bottom of the pressure-application zone 3, but also from intermediate portions as shown in FIG. 4, by providing holes 9 or slits at the intermediate portion.

FIGS. 5 and 6 each show an embodiment of the pressure-application zone 3. When a chain member is used as the high tensile member, the inside of the pressure-application zone 3 is designed in a cross-like form as shown in FIG. 6 and its inner sectional area is continuously reduced in the direction in which the high tensile member 4 is pulled. By changing the inner sectional configuration from a circular form to a cross-like form, a cryohydrate 6 comprising a solvent having a markedly high purity can be obtained, although the volume of the cryohydrate passing therethrough is reduced.

The cryohydrate 6 having a low solute content is, if necessary, melted by heating and obtained as a liquid.

The process of this invention permits continuously and efficiently separating one or more kinds of solute and a medium from various solutions and furthermore by a markedly simplified procedure. The process of this invention can be applied advantageously to treat a solution containing various heat-sensitive solutes, such as fruit juice, fermented solution, etc.

The following Examples are given to illustrate this invention in greater detail although this invention is not limited thereto.

EXAMPLE 1

An apparatus as shown in FIG. 1 was built by assembling a hollow cone-shaped member having a height of 50 millimeters, a inner diameter of bottom of 40 millimeters, and an inner diameter of top of 28 millimeters as a pressure-application zone and a stainless steel chain member having an outer diameter of 20 millimeters as a high tensile member.

A 13% aqueous solution of sugar was frozen at $-9°$ C. together with the high tensile member to obtain a cryohydrate in which the high tensile member was enveloped. The thus obtained cryohydrate was pulled in the direction shown in the Figure at a rate of 2 centimeters per minute. At this time, the tension was about 1.4 tons.

The cryohydrate leaving the pressure-application zone had a sugar content of 0.7%, whereas the sugar content of the liquid obtained from the bottom of the pressure-application zone was about 35%.

On passing through the pressure-application zone, the sectional area of the cryohydrate was reduced to about 6.4 cm$^2$. Based on the reduced sectional area, it was determined that a pressure of about 220 Kg/cm$^2$ was applied on the cryohydrate for about 2.5 minutes.

EXAMPLE 2

In this example, a pressure-application zone as shown in FIGS. 5 and 6, the inside of which was designed to have different sections, changing continuously from a circle form to a cross-like form, was used. The lines indicated by L-L; M-M', N-N', and O-O' in FIG. 6 represent cross-sections of the pressure-application zone, taken along lines L-L', M-M', N-N' and O-O' in FIG. 5.

The outlet through which the cryohydrate was withdrawn after the pressure-application, i.e., O-O' section was designed so that the chain member pulling the cryohydrate could pass therethrough smoothly. In this example, the open area of the O-O' section was about 4.6 cm$^2$. In the same manner as in Example 1 except that the material and inside configuration of the pressure-application zone were changed, an apparatus for the separation of a solute was assembled.

A 12% aqueous solution of sugar was frozen at $-8°$ C. together with the chain member to form a cryohydrate. The thus obtained cryohydrate was pulled at a rate of 15 to 22 centimeters per minute, and the tension was about 2.5 tons.

The cryohydrate leaving the pressure-application zone had a sugar content of 0.6%, whereas the sugar content of the liquid obtained from the bottom of the pressure-application zone was 28%. The reduced sectional area of the cryohydrate at the pressure-application zone was about 8 cm$^2$. It was determined that a pressure of 310 Kg/cm$^2$ was applied onto the cryohydrate.

What is claimed:

1. An apparatus for the separation of solute or solutes from a cryohydrate which comprises
an endless member fabricated of a material having a high tensile strength;
a reservoir to store a solution therein and including means for applying said solution to said endless member;
a freezing unit;
a pressure-application unit;
means for drawing said endless member sequentially through said solution applying means, said freezing unit and said pressure-application unit such that all surfaces of said endless member are enveloped in said solution, the solution enveloping said endless member being frozen onto said endless member as it is drawn through said freezing unit;

said pressure-application unit having fixed position and static pressure applying means, and being located downstream of said freezing unit and through which said endless member passes, said pressure applying means including a sleeve-like member surrounding a portion of said endless member and extending longitudinally of said endless member, said sleeve-like member having static inner walls defining an inner sectional area which is reduced in the direction in which said endless member passes therethrough, the inner sectional area being positioned and dimensioned to apply surrounding pressure to frozen solution enveloping said endless member by applying pressure between opposing portions of said endless member and said inner walls of said sleeve-like member under drawing force applied to said endless member by said drawing means; and said pressure-application unit further including a liquid receiving reservoir at a lower portion thereof.

2. The apparatus of claim 1 wherein said endless member is an endless chain member.

3. The apparatus of claim 2 wherein said endless member is a steel rope.

4. The apparatus of claim 2 wherein said endless member is a metallic rod provided with at least one projection.

5. The apparatus of any one of claims 1, 2, 3 or 4, wherein said pressure-application unit has an inner surface having the shape of a frustum of a cone.

* * * * *